(12) United States Patent
Guigan et al.

(10) Patent No.: US 8,472,118 B2
(45) Date of Patent: Jun. 25, 2013

(54) PRINTED OPTICAL MEMBERS

(76) Inventors: Franck Guigan, Paris (FR); Martine Guigan, Paris (FR); Antoine Guigan, Paris (FR); Charles Guigan, Paris (FR); Pierre Guigan, Boulogne Billancourt (FR)

( * ) Notice: Subject to any disclaimer, the term of this patent is extended or adjusted under 35 U.S.C. 154(b) by 31 days.

(21) Appl. No.: 12/992,720

(22) PCT Filed: May 13, 2009

(86) PCT No.: PCT/FR2009/050883
§ 371 (c)(1),
(2), (4) Date: Jan. 26, 2011

(87) PCT Pub. No.: WO2009/147353
PCT Pub. Date: Dec. 10, 2009

(65) Prior Publication Data
US 2011/0116152 A1    May 19, 2011

(30) Foreign Application Priority Data

| | | |
|---|---|---|
| May 13, 2008 | (FR) | 08 02556 |
| May 15, 2008 | (FR) | 08 02636 |
| May 26, 2008 | (FR) | 08 02819 |
| May 26, 2008 | (FR) | 08 02821 |
| Jun. 2, 2008 | (FR) | 08 03024 |
| Jul. 7, 2008 | (FR) | 08 03831 |
| Jul. 17, 2008 | (FR) | 08 04067 |
| Aug. 5, 2008 | (FR) | 08 04451 |
| Sep. 11, 2008 | (FR) | 08 04981 |
| Sep. 23, 2008 | (FR) | 08 05222 |
| Oct. 13, 2008 | (FR) | 08 05642 |
| Nov. 18, 2008 | (FR) | 08 06433 |
| Nov. 18, 2008 | (FR) | 08 06434 |
| Dec. 8, 2008 | (FR) | 08 06855 |
| Dec. 12, 2008 | (FR) | 08 06995 |
| Dec. 30, 2008 | (FR) | 08 07499 |
| Jan. 19, 2009 | (FR) | 09 00222 |

(51) Int. Cl.
*G02B 27/10* (2006.01)

(52) U.S. Cl.
USPC .......................................................... 359/621

(58) Field of Classification Search
USPC .......... 359/242, 619, 620, 621, 622; 427/162;
385/33, 35; 257/432, 443
See application file for complete search history.

(56) References Cited

U.S. PATENT DOCUMENTS

| 1,918,705 A | 7/1933 | Ives |
| 1,942,841 A | 1/1934 | Shimizu |

(Continued)

FOREIGN PATENT DOCUMENTS

| EP | 0489650 A1 | 6/1992 |
| EP | 1428675 A2 | 6/2004 |

(Continued)

*Primary Examiner* — Tuyen Tra
(74) *Attorney, Agent, or Firm* — The Webb Law Firm

(57) ABSTRACT

Optical elements such as microlenses or optical fibers are printed with liquid ink, by known scanning printing techniques such as for example flexography. Each optical element has a transparent core printed by a first ink layer, that is sufficiently distant from the closest cores so as not to amalgamate with them by coalescence, before being hardened. This core is then covered with one or several so-called additional layers which can be flat tint layers in order to finalize the shape of the optical element in question. The section of the optical elements is determined by the difference in surface tension between the additional layers and the printing substrate.

15 Claims, 7 Drawing Sheets

U.S. PATENT DOCUMENTS

| | | | |
|---|---|---|---|
| 3,241,429 A | 3/1966 | Rice et al. |
| 3,622,384 A | 11/1971 | Davey et al. |
| 5,293,437 A | 3/1994 | Nixon |
| 5,330,799 A | 7/1994 | Sandor et al. |
| 5,694,246 A | 12/1997 | Aoyama et al. |
| 5,707,684 A | 1/1998 | Hayes et al. |
| 5,723,176 A | 3/1998 | Keyworth et al. |
| 6,297,911 B1 | 10/2001 | Nishikawa et al. |
| 6,481,844 B1 | 11/2002 | Beery |
| 6,833,960 B1 | 12/2004 | Scarbrough et al. |
| 6,856,462 B1 | 2/2005 | Scarbrough et al. |
| 7,428,103 B2 | 9/2008 | Boettiger et al. |
| 8,007,896 B2 * | 8/2011 | Hicks et al. | 428/141 |
| 2002/0027300 A1 | 3/2002 | Hartmann et al. |
| 2003/0122055 A1 * | 7/2003 | Rughani | 250/208.1 |
| 2004/0045931 A1 | 3/2004 | Hill et al. |
| 2005/0088750 A1 | 4/2005 | Hasei |
| 2005/0133688 A1 | 6/2005 | Li et al. |
| 2006/0262410 A1 | 11/2006 | Toyoda |

FOREIGN PATENT DOCUMENTS

| | | |
|---|---|---|
| WO | 9509372 A1 | 4/1995 |
| WO | 9936830 A2 | 7/1999 |

* cited by examiner

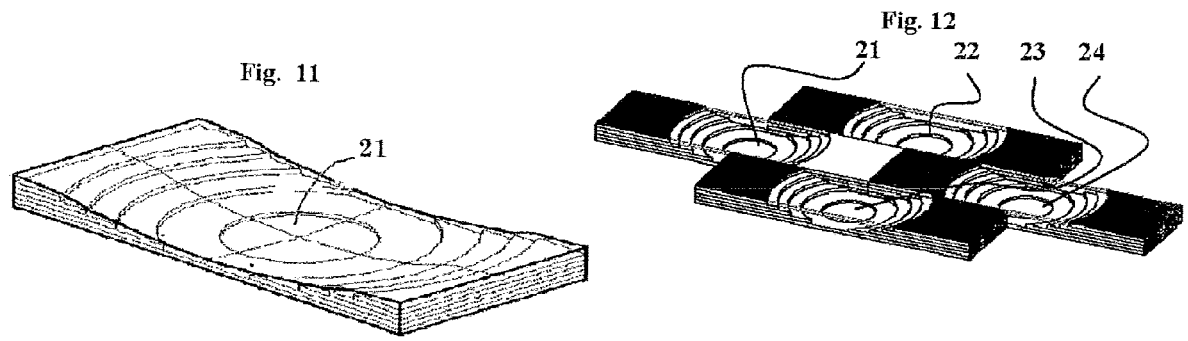
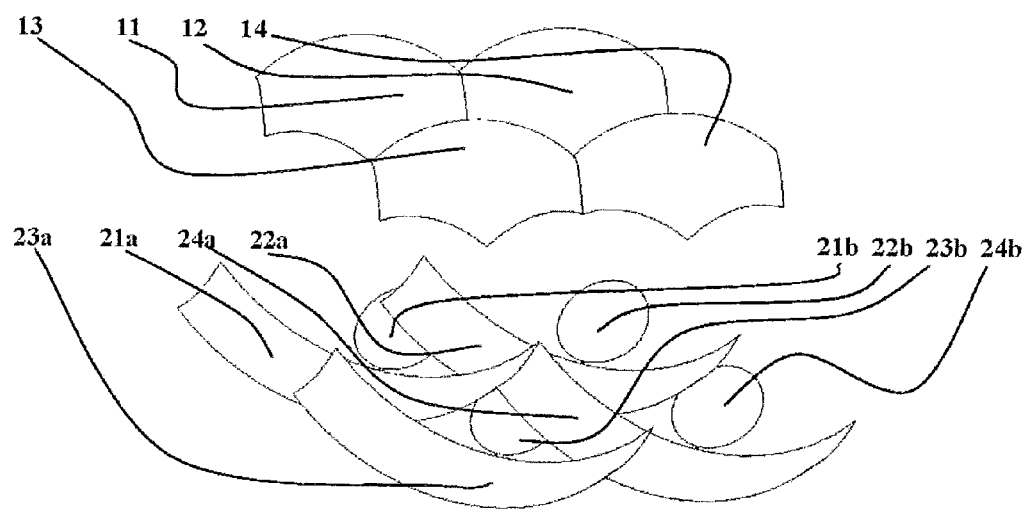
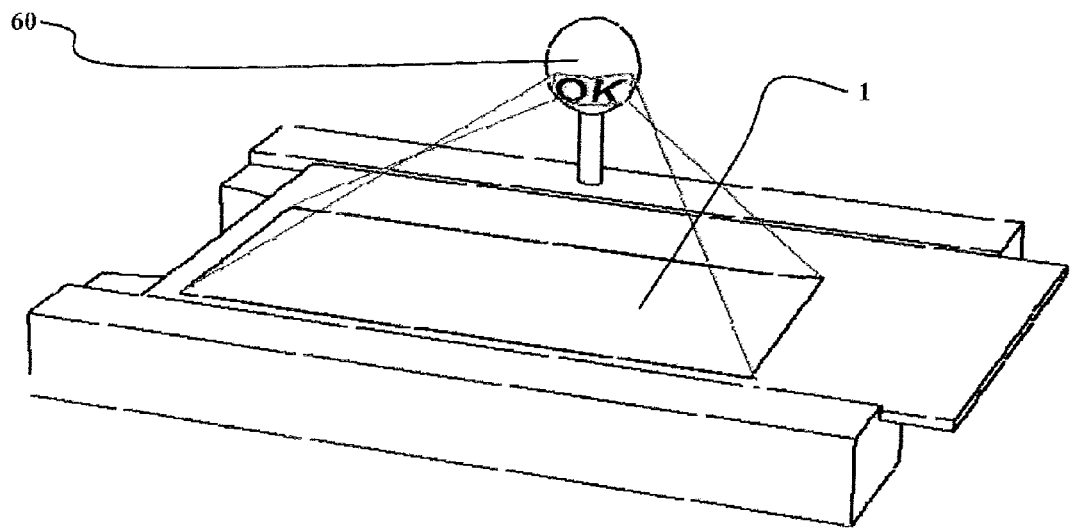

Fig. 19a    Fig. 19b    Fig. 19c
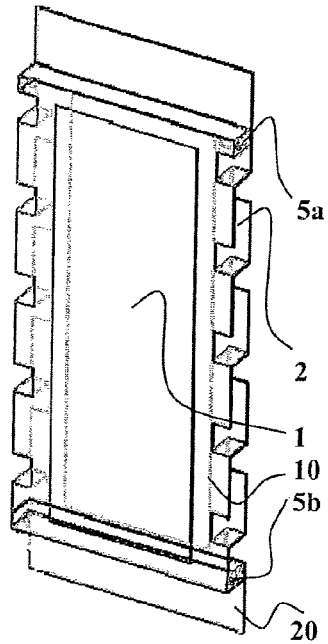
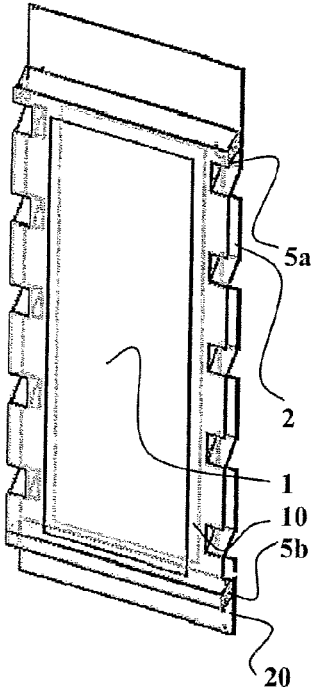
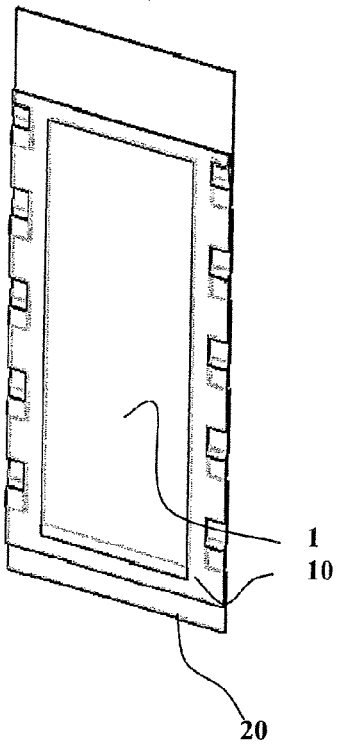
Fig. 20
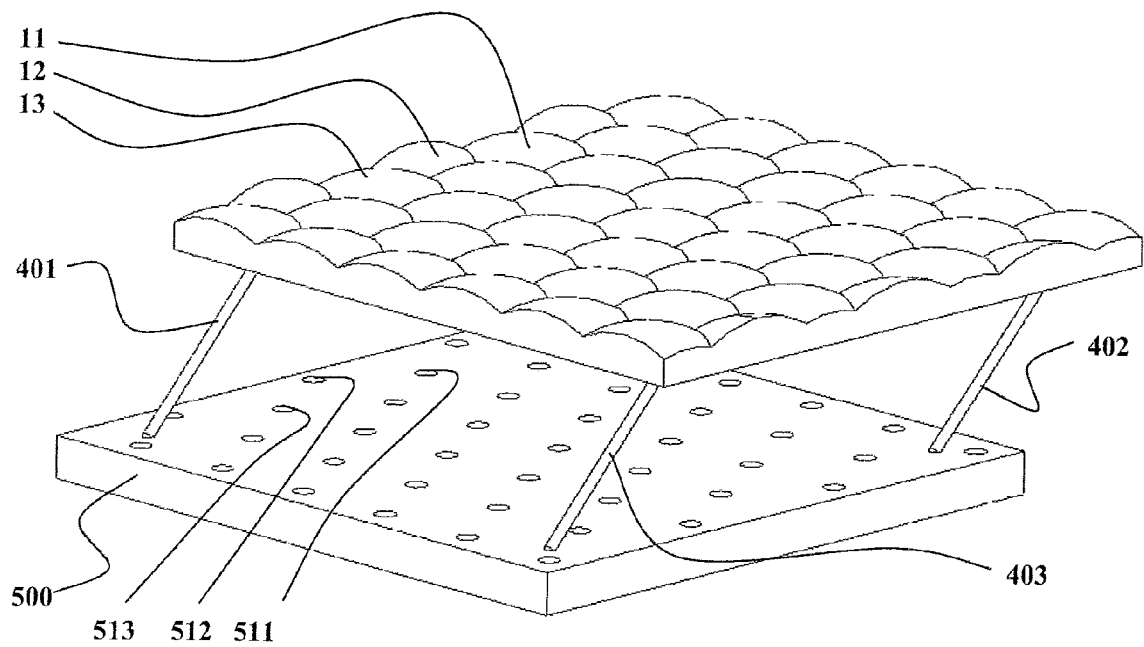

PRINTED OPTICAL MEMBERS

TECHNICAL FIELD

The present invention relates to devices comprising varied optical elements such as convex lenses of all types, cylindrical or spherical, with circular, hexagonal or square pupils, optical fibers, waveguides, couplers, mixers and switches placed on all kinds of substrates to create optical and optoelectronic circuits. It also relates to a method for printing optical elements implementing low-priced and well-known printing techniques such as offset, heliography, flexography, screen printing, pad printing and inkjet for example, all of which use ink in a liquid phase.

The common characteristics of printed optical elements are that they must have a transparent "core", be isolated from their neighbors by air, a transparent material of different refractive index or a reflective surface, and have a very precise shape corresponding to their function, while occupying as little space as possible to enable miniaturization.

The problem to be solved is to avoid coalescence between neighboring elements while printing, as these elements exist at the beginning in the liquid state, the coalescence phenomenon being the fact that two drops of ink that are too close from each other amalgamate into one single drop.

PRIOR ART

Several patents are known which enable the manufacturing of arrays of optical lenses, but they are using techniques out the scope of printing methods:
- U.S. Pat. No. 5,330,799 describes a method of die casting,
- U.S. Pat. No. 6,297,911 B1 describes a method consisting in depositing a solid material on surfaces, and in heating that material to give it the desired convexity,
- U.S. Pat. No. 5,694,246 also includes a heating step,
- U.S. 2005/133688 A1 implements a spray source, at a certain angle of the substrate surface,
- U.S. 2006/262410 A1 provides transforming by heating a convex design into a concave surface,
- U.S. Pat. No. 7,428,103 describes a method of manufacturing a lenticular array by implementing a process of reflow, a known method of "re-fusion" consisting in heating—usually in an oven—a set of two types of elements (here all preliminary shapes of microlenses and the substrate) to form a strong and lasting link between two elements.

Several patents are also known which enable the production of printed optical elements of all kinds, but implementing only plotting printing techniques consisting in depositing a material with a robot that follows a defined path: U.S. Pat. No. 5,723,176 A, U.S. 2005/0088750 A1 and U.S. Pat. No. 5,707,684 A. These methods are not suitable for mass production. The authors have limited their applications to this very slow and very expensive type of production because the technical solutions they offer do not allow the use of mass-production printing techniques.

Finally several patents are known which implement techniques of mass-printing to obtain arrays of optical lenses: WO 99/36830, U.S. Pat. No. 3,622,384, PCT/JP94/01634, U.S. Pat. No. 6,481,844, U.S. Pat. No. 6,833,960 and U.S. Pat. No. 6,856,462, but none offers a means to prevent coalescence, and thus does not allow to obtain contiguous lenses or optical fibers, whilst this is the goal which has been pursued by all researchers for a long time to lower prices of optical components, in particular lenticular arrays, optical fibers, and optoelectronic cards that are the future of computing and telecommunications technology.

SUMMARY OF THE INVENTION

The present invention is a device comprising several elements called "printed optical elements" printed by a scanning printing technique on a printing substrate, characterized by the fact that a printed optical element comprises a transparent convex protrusion called "core" covered with at least one layer of ink called "additional layer" to form a convex protrusion, being clear that here above and here below "scanning printing technique" means a printing technique which—as for example offset or offset without damping (known as "waterless") or typography, or flexography, or screen printing or pad printing, or scanning inkjet printing—involves depositing a liquid substance hereinafter called "ink" onto a printing substrate, at once or by successive stripes from an edge of said printing substrate to the opposite edge, as opposed to a plotting printing, which consists in moving a deposition device along each curve to trace on the said printing substrate, with ink deposited in liquid form, as opposed to manufacturing techniques consisting in depositing a solid substance which is then transformed, for example by heating, into a liquid deposition.

The present invention is also a method for manufacturing printed optical elements consisting in:

depositing with a scanning printing technique a first layer of a transparent liquid substance on surfaces called elementary surfaces of a printing substrate to form convex protrusions called cores, making such cores solid by any known means such as cooling, drying or curing, and subsequently depositing, again with a scanning printing technique, one or more layers called additional layers of a liquid substance on at least part of said printing substrate, each said additional layer being made solid by any known means such as cooling, drying or curing,

BRIEF DESCRIPTION OF DRAWINGS

The invention will be better understood and other aims, advantages and characteristics thereof will appear more clearly upon reading the following description, which is illustrated by the accompanying drawings, wherein:

FIG. 11 is a perspective view of a series of layers of ink forming a curved surface on which is printed a curved elementary encoded image cooperating with an elementary lens of a lenticular array, FIG. 12 shows four elementary encoded images so constructed, FIG. 13 is a perspective view of three main curved elementary encoded images, combined with three additional curved elementary encoded images that are superimposed on the main curved elementary encoded images, and are visible from certain points of view only, FIG. 14 is a perspective view of a lenticular array according to the invention, placed in a vision device to determine the parallax, which includes a mirror ball, FIGS. 19a, 19b and 19c are three views in perspective of a device according to the invention in a particular implementation enabling the winding of the device for transportation or for display devices offering several different images that appear one after the other by winding the posters on a reel, and FIG. 20 is a perspective view of a light sensor according to the invention.

DETAILED DESCRIPTION OF PARTICULAR EMBODIMENTS ACCORDING TO THE INVENTION

Figure 1:
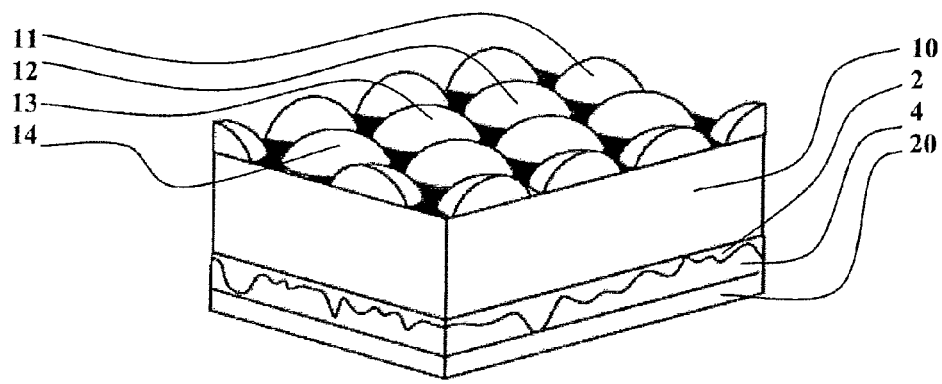
FIG. 1 is a perspective view of a lenticular array according to the invention.

In FIG. 1 which is a perspective view of a lenticular array according to the invention, one can distinguish elementary lenses 11, 12, 13 and 14, the substrate 10 for printing lenses, the substrate 20 for printing the encoded image 2, the encoded image 2 whose ink thickness is variable depending on the location, and the thickness creation volume 4 which is printed on the substrate 20 before printing the encoded image so that the upper surface of the latter is flat, common with the focusing plane of said elementary lenses.

Figure 2:
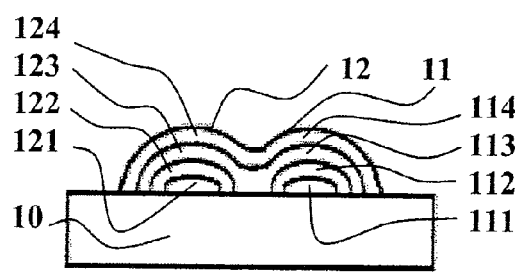
FIG. 2 is a sectional view of two optical elements juxtaposed with coalescence occurring between layers of the juxtaposed optical elements.

FIG. 2 is a sectional view of two juxtaposed optical elements with coalescence occurring between layers of these juxtaposed optical elements 11 and 12, each being composed of several layers of ink, the optical element 11 respectively 12 comprising a first layer (the "core") 111, respectively 121 and following layers ("additional" layers) 112, 113, 114 respectively 122, 123, 124. This figure shows coalescence having occurred between layers 113 and 123 of optical elements 11 and 12.

Figure 3:
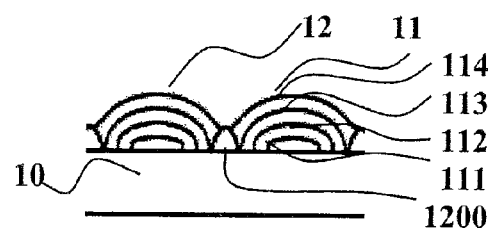
FIG. 3 is a sectional view of two similar juxtaposed optical elements, separated by a separation volume, which prevents the coalescence.

FIG. 3 is a sectional view of two similar juxtaposed optical elements 11 and 12, separated by a separation volume 1200, which prevents this coalescence.

Figure 4:
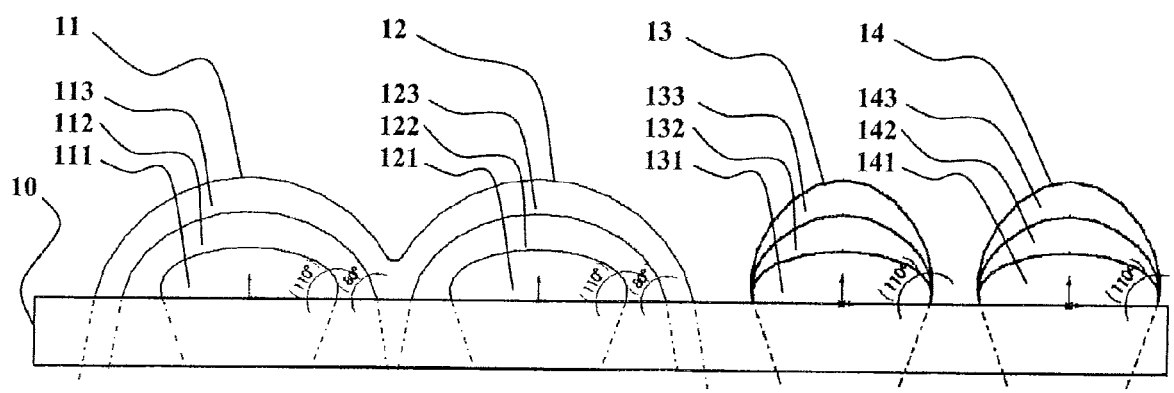
FIG. 4 is a sectional view of four juxtaposed optical elements printed on a substrate whose upper surface has a low surface tension.
Figure 5A:
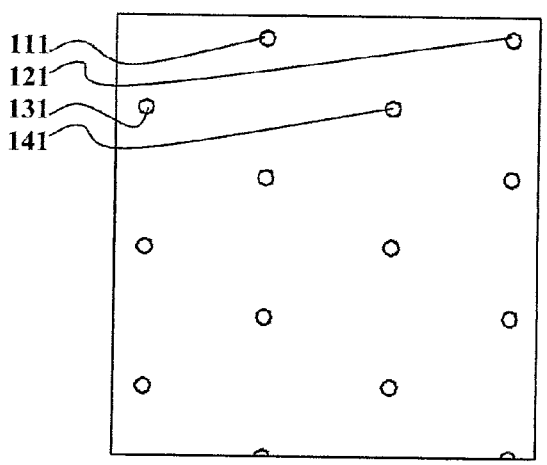
FIGS. 5a to 5e are top views illustrating the application to spherical lenses of the method of applying layers that are increasingly large.
Figure 5B:
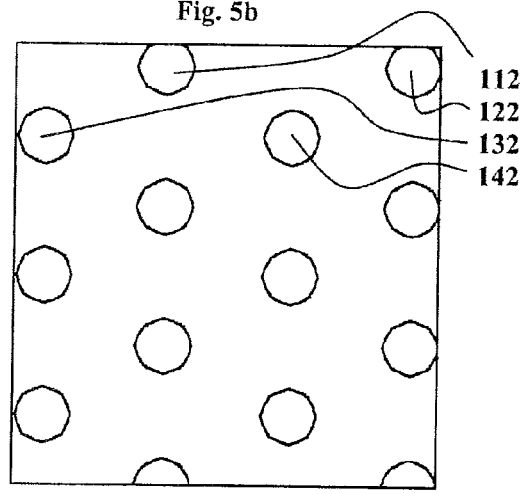
Figure 5C:
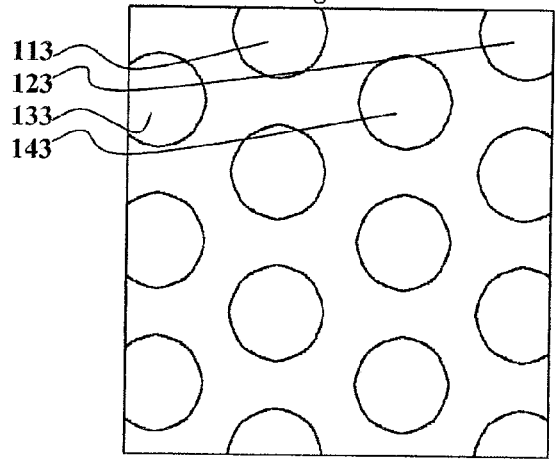
Figure 5D:
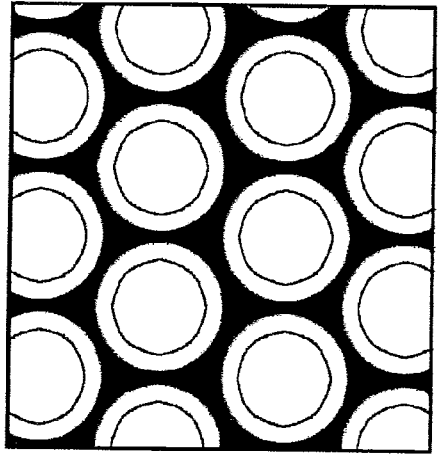
Figure 5E:
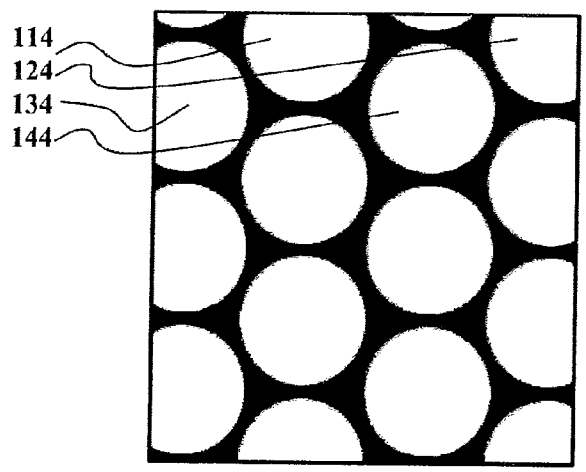
Figure 6A:
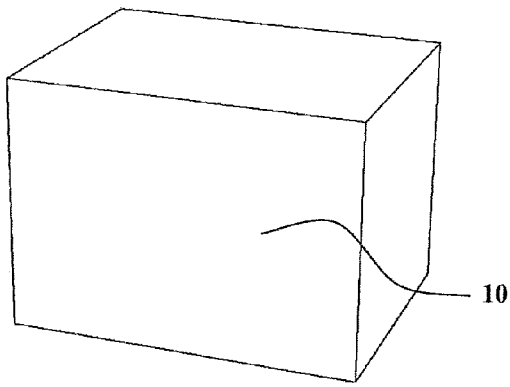
FIGS. 6a to 6f are perspective views illustrating the application to spherical lenses of the method consisting in applying a first layer comprising only lens of preliminary shapes, with an ink having a high surface tension, on a flat tint having a lower surface tension.
Figure 6B:
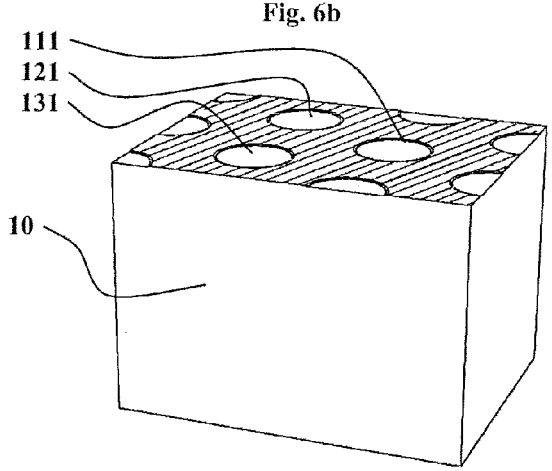
Figure 6C:
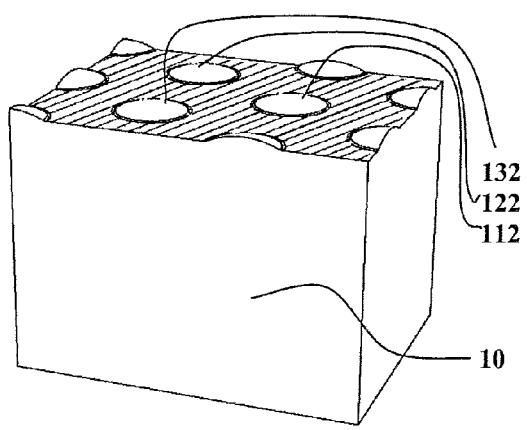
Figure 6D:
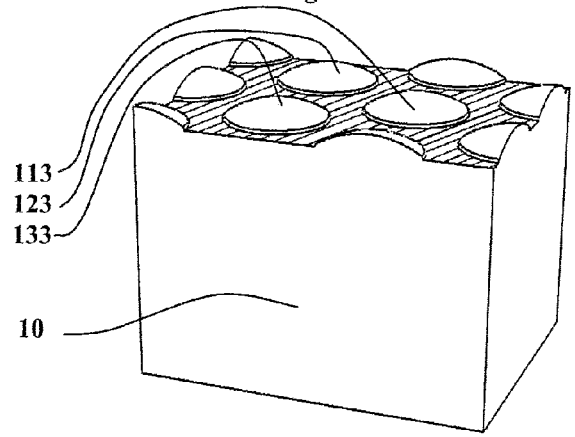
Figure 6E:
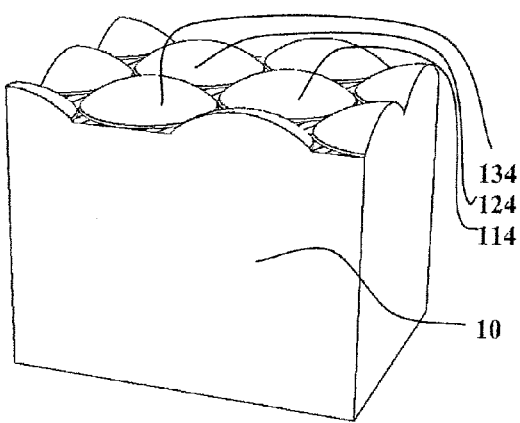
Figure 6F:
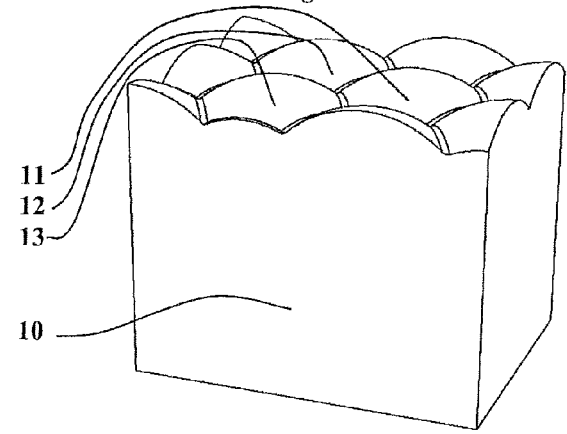

FIG. 4 is a sectional view of four juxtaposed optical elements 11 to 14 printed on a substrate whose upper surface has a low surface tension. It illustrates the use of flat tint layers with different surface tensions on a support having a low surface tension which has received in a first step some cores printed by an ink having a high surface tension.

FIGS. 5a to 5e are top views illustrating the application to spherical lenses of the method consisting in applying layers 111 to 114, 121 to 124, 131 to 134, 141 to 144 that are increasingly large.

FIGS. 6a to 6e are perspective views illustrating the application to spherical lenses of the method consisting in applying a first layer consisting only of lens preliminary shapes 111, 121, 131, with an ink having a high surface tension, on one flat tint (as identified by hatching) whose surface tension is lower. One then applies high surface tension flat tint (layers 112, 122, 132, 113, 123, 133, 114, 124, 134) which are driven out by the shaded area to have each lens progressively get bigger, until that contiguous lenses 11, 12, 13 are obtained.

Figure 7:
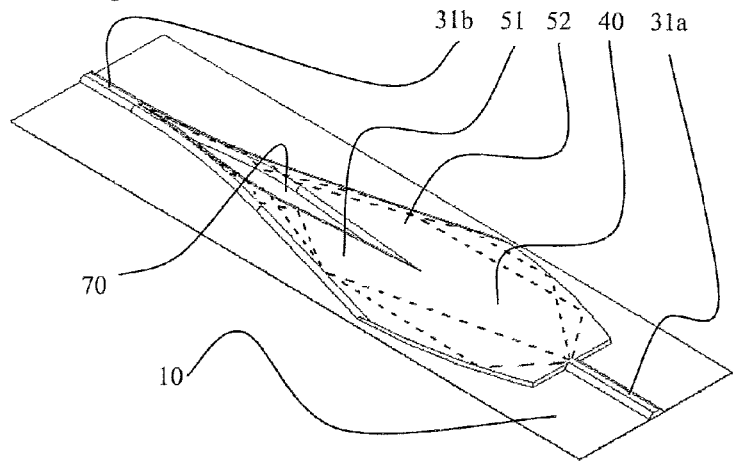
FIG. 7 is a perspective view of a printed optical fiber connected to a rectifier, whose side walls reflect the rays making them more parallel to the longitudinal axis of said fiber.

FIG. 7 is a perspective view of a printed optical fiber 31a connected to a rectifier 40 whose side walls reflect the rays making them more parallel to the longitudinal axis of said fiber 31a. The rays are then focused by two concentrators 51 and 52 separated by a slot 70 to pass through the fiber 31b. The axis of a light beam carried by the fiber 31 is closer to the longitudinal axis of the fiber 31b than they were in fiber 31a.

Figure 8:
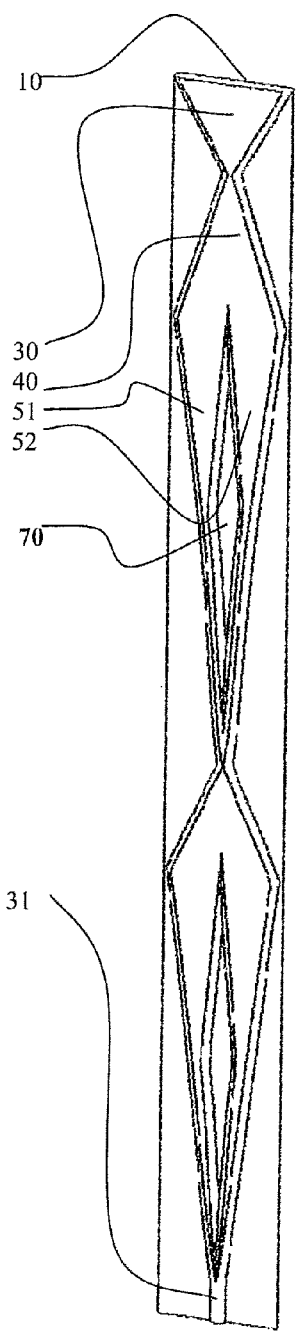
FIG. 8 is a perspective view of a somewhat similar device with several stages, starting with an open concentrator, which collects the ambient light rays through its upper surface.

FIG. 8 is a perspective view of a somewhat similar device with several stages, starting with an open concentrator, which collects the ambient light rays from the top.

Figure 9:
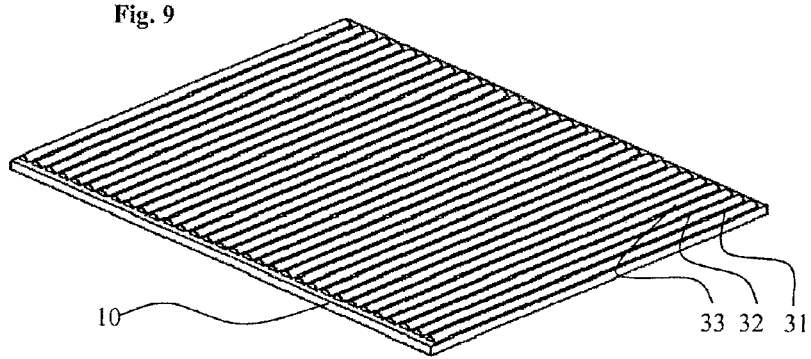
FIG. 9 is a perspective view of a sheet of juxtaposed optical fibers

FIG. 9 is a perspective view of a layer of juxtaposed optical fibers 31, 32 and 33.

Figure 10:
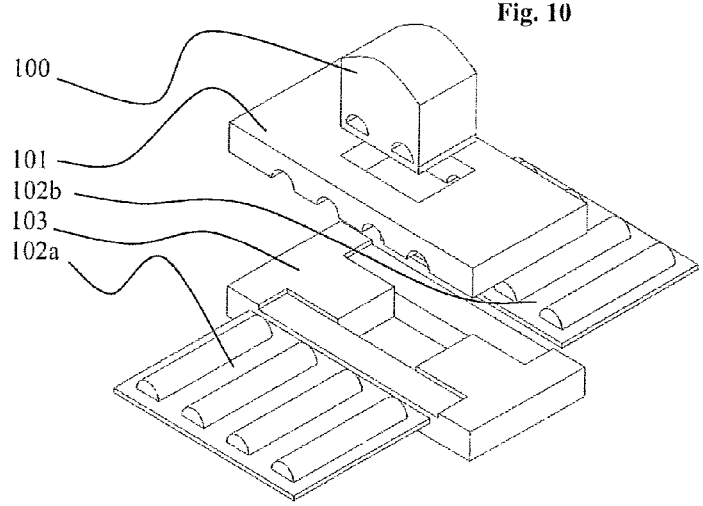
FIG. 10 is a perspective view of a connector between a first layer of optical fibers and a second layer of optical fibers.

FIG. 10 is a perspective view of a connector between a layer 102a of optical fibers and a layer 102b of optical fibers. Two reflective elements 101 and 103 embrace the front and back surfaces of these layers, and ensure the transmission of light rays from one to another. The movable part 100, which is also reflective, enables to block or let pass light rays, according to its more or less depressed position. Such a device is a mechanical switch.

FIG. 11 is a perspective view of a series of layers of ink forming a curved surface on which is printed a curved elementary encoded image 21 cooperating with an elementary lens 11 of a lenticular array.

FIG. 12 shows four elementary coded images 21 to 24 so constructed.

FIG. 13 is a perspective view of three main curved elementary encoded images 21a, 22a, 23a and 24a, combined with three additional curved elementary encoded images 21b, 22b and 23b and 24b that are superimposed on said main curved elementary encoded images, and visible from certain points of view only.

FIG. 14 is a perspective view of a lenticular array according to the invention, placed in a vision device to determine the parallax, which includes a mirror ball 60.

Figure 15:
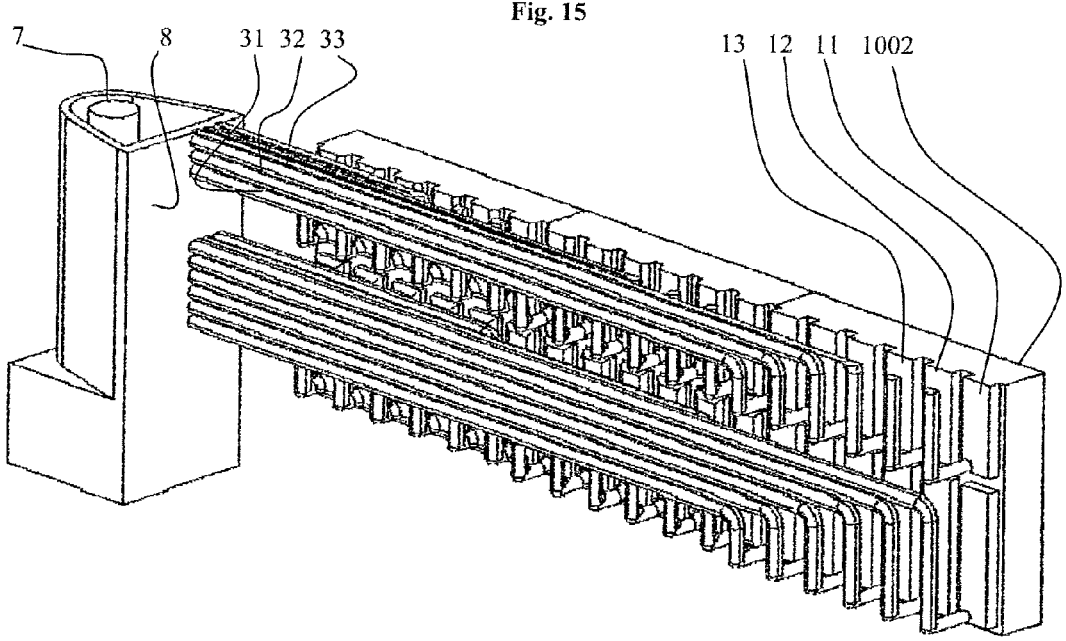
FIG. 15 is a perspective diagram of a television screen printed according to the invention.

FIG. 15 is a perspective diagram of a printed television screen according to the invention. Indicators 11, 12 and 13 constitute the ends of printed optical fibers 31, 32 and 33, which receive light from a light source 7 which is encoded by a liquid crystal panel 8.

Figure 16:
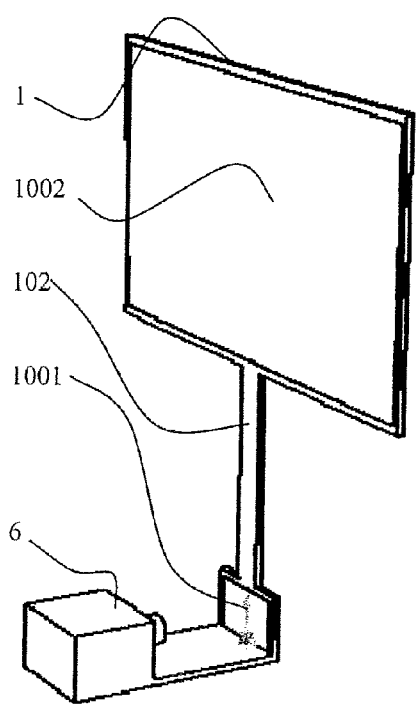
FIG. 16 is a perspective view of a screen according to the invention, comprising a part receiving the image from a projector on the upstream ends of optical fibers arranged in a printed sheet to feed a television screen.

FIG. 16 is a perspective view of a screen 1 according to the invention, comprising a part 1001 receiving the image of a projector 6 on the upstream ends of printed optical fibers arranged in a sheet 102 towards a part 1002 which is such a television screen.

Figure 17:
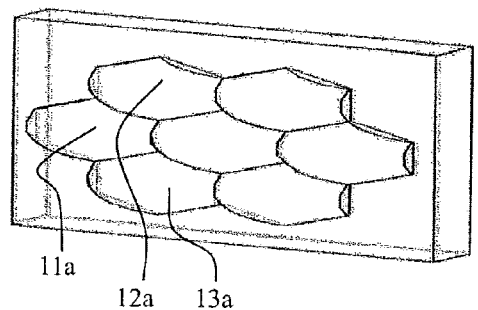
FIG. 17 is a perspective view of a lenticular array according to the invention, the elementary lenses being aspheric—distorted in width so that parallel rays converge to a horizontal segment and not to a point.

FIG. 17 is a perspective view of a lenticular array according to the invention, whose elementary lenses 11a, 12a and 13a are aspheric—distorted in width so that parallel rays converge to a horizontal segment and not to a point. The rear surface of said lenticular array is not placed exactly in the focal plane of its elementary lenses and is white. Such a device is a projection screen. The light from the projector gives rise behind each lens to a spot of light stretched horizontally, which is visible from a field of vision that the man skilled in the art can calculate.

Figure 18:
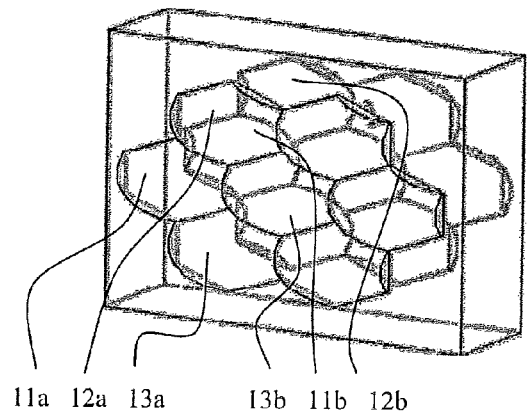
FIG. 18 is a perspective view of a transparent double lenticular array comprising first elementary lenses and second elementary lenses being in registration with the first ones.

FIG. 18 is a perspective view of a transparent, double lenticular array with elementary lenses 11a, 12a and 13a, as well as elementary lenses 11b, 12b and 13b located opposite the former. The thickness of the device is substantially equal to the total focal length of the front and back elementary lenses. The light projected by a projector on one side of the device is transmitted by a lens onto the surface of the lens situated in registration, and recovered by the latter to be visible from a field of vision that a man skilled in the art can also calculate.

FIGS. 19a, 19b and 19c are three views in perspective of a device according to the invention in a particular implementation enabling the winding of the device for transportation or for display devices offering several different images that appear one after the other by winding the posters on a reel. The device is in operating position in FIG. 19a and flattened for transportation or reeling in FIG. 19c. FIG. 19b shows an intermediate position.

According to the invention, the above-described cores must be sufficiently spaced apart so that the phenomena of surface tension cannot result in the fusion of two nearby cores into one before they have become solid.

The said additional layer is mandatory because it allows to finalize the form of an optical element without its core merging with its neighbor.

A first preferred method has the advantage of not having to register the layers of ink against each other. It consists in creating reference marks on each site planned for a protrusion, either by printing this reference mark with an ink having a higher surface tension than that of the substrate or by printing the portion which is not a mark with an ink having a surface tension which is lower than that of the substrate. One prints the first layer in the form of a flat tint layer with a much higher surface tension than the one of the area not including marks, and the ink of this first layer does not remain on the rest of the substrate. It is attracted towards the reference marks and forms a protrusion preliminary shape. One then prints one or more additional ink layers—always in the form of flat tint layer and always using an ink with higher surface tension than that of the part of the substrate not covered with protrusion preliminary shapes—so that the ink of each successive flat tint layer is attracted to the area already covered with protrusion preliminary shapes and makes the protrusion preliminary shapes grow bigger. Such a method is illustrated in FIGS. 6a to 6f. The creation of reference marks can be achieved by printing the locations planned to become a reference mark, or the rest of the substrate, with any printing technique known as the offset (very accurate) or even with a deposition in a non-liquid form with for example a laser printer.

The printing of reference marks and the printing of the first layer may be merged. The cores created by said first layer are then used as reference marks for additional layers.

FIG. 4 illustrates the desirability of choosing the proper ink for the printing of cores and additional layers. The surface tensions of cores 111, 121, 131 and 141 of the four optical elements are identical, and very high, which has as a consequence that the contact angle between these cores and the substrate is very high, of 110 degrees. Two flat tint layers were then deposited on the entire surface of the substrate 10. The lenses 13 and 14 have received the ink that has the same surface tension as that used for cores, which have then grown vertically (additional layers 132, 133 and 142, 143), while the ink used for flat tint layer lenses on the surface containing the lenses 11 and 12 had a slightly lower surface tension, which had as a consequence that the contact angle between on the one hand said surface layers 112 and 113 of element 11 and 122 and 123 of element 12, and on the other hand the substrate is lower, only 80°. Lenses 11 and 12 have thus grown up by widening. By adjusting the surface tensions, the first preferred method thus allows to achieve lenses with very short focal lengths, which is very favorable for certain applications such as labels, for example.

A second method consists in printing with the first layer only a preliminary shape of each protrusion, said preliminary shape being subsequently completed by filing an additional layer of ink. An additional layer itself is advantageously applied onto an area which is significantly smaller or larger than that on which the first layer was applied according to the desired shape which is to be given to the protrusion concerned. It should be noted that in many cases, printing two ink layers on identical surfaces has the same effect as when the second ink layer covers an area larger than the first one. It is therefore an advantageous solution when using an ink jet printer which makes multiple passes of the print head print the same printing program for lenses, because it results in the deposit of ink on an area significantly larger than that of the protrusion created by the previous layer.

According to a third method an ink layer concerns only a first subset of planned protrusions, said subset comprising protrusions more spaced apart than two immediately adjacent planned protrusions, and other subsets of protrusions are printed later, after hardening of said first subset of protrusions. Said first layer concerns a cylindrical lens out of two or one spherical lens out of three. The first cores thus created do not touch each other and one completes the set of optical components with the next layer.

A fourth method consists in creating with one of the ink layers physical barriers 1200 to impede the spreading of a subsequent ink layer outside areas planned for the protrusions, as described in FIG. 3.

In all the methods previously exposed, it is advantageous to use an aqueous ink to achieve a so-called additional layer, because these inks can have very high surface tensions. This is particularly advantageous for the last layer that forms the surface film of the optical elements.

The present invention also permits to produce double lenticular arrays—with lenses both on the front and on the back of the substrate—which are automatically registered with high accuracy between the front and back of the printing substrate 10. A surface printed on the front, such as a reference mark, a protrusion preliminary shape or a finalized protrusion, serves as a reference mark for printing on the back of the printing substrate 10, as follows: a flat tint layer of a UV curable material is printed on the back of the substrate 10 which is transparent to UV radiation, a UV radiation is emitted from the front side to the back of the substrate and, depending on the nature of the protrusion, which is transparent and convex, or opaque to UV rays, some areas of the flat tint layer on the back side are cured and others are not. It only remains to remove the ink remaining unhardened on the back side. Elementary lenses may then be printed on the back side of the printing substrate 10 with that first method.

This method can be implemented in two ways depending on whether the ink printed on the back as flat tint layer has a surface tension higher or lower than the rest of the surface of the back side. In the first case, the UV hardens the ink situated opposite a protuberance of a convex lens preliminary shape or of a finished lens. In the second case, it hardens the ink located in an area that is not hidden by a reference mark.

The preferred method is as follows:
  the printing substrate is transparent, its front face includes elementary lenses or elementary lens preliminary shapes, and its back side has a low surface tension,
  a high surface tension flat tint layer is printed on the back side, without being immediately hardened,
  UV radiation is emitted from the front side towards the rear side of the substrate, which has the effect of hardening the back side areas located in the alignment of the UV source and of the optical centers of said elementary lenses,
  the ink remaining unhardened on the back side is removed,
  a so-called first layer of ink is printed on the back side in the form of a flat tint layer the ink of which is attracted by its high surface tension to the reference marks due to its high surface tension.

The UV radiation may be emitted from a diffuse or linear or punctual source. It may be emitted from a position determined by the man skilled in the art to create a parallax difference in order to lay out the lenses of the back with a distance between themselves which is larger than the distance between those of the recto.

One can use this method to create two converging aspheric lenses on the front and back sides of a printing substrate 10, one on the front side and another on the back side, especially as lenses that are both portions of volumes of revolution having the same axis. The advantage is that when the lenses are distorted in width for each to be an ellipsoid which is wider than high, the device is an overhead screen that diffuses the light rays from the projector to a field of vision which is wider than high.

Several other methods can be used in the context of this invention to create printed optical elements in combination or not with the methods already described.
  One lays a layer which is a primer, and then an additional layer which is an ink having a high affinity for that primer.
  One applies a voltage to the printing substrate before printing an ink layer, only on the surfaces on which one wants to print a protrusion.
  One applies a voltage on a layer of ink before it is layered.
  One burns the surface of the printing substrate before printing the first ink layer, only on areas on which one wants to print a protrusion.
  One applies a Corona effect, i.e. a bombardment of electrons and ions on the surface of the printing substrate 10, before printing an ink layer.
  One freezes, one cooks or burns the material of the printing substrate 10, either on the whole area which is destined to receive optical elements, or only in the center of the areas destined to receive elementary optical elements.
  One modifies the surfaces of the central locations due to receive elementary optical elements by any known mechanical means to promote adhesion of said first layer, which can then be printed as one flat tint layer.

Several improvements of the above described methods are proposed:
  One chooses to cure or not to cure a so-called additional layer before printing the next one, to increase or decrease the thickness and curvature of the relevant optical element, taking into account the viscosity and surface energy of the ink used.
  One deposits one or more layers of any substance to create a thickness creation volume 4 on the printing substrate 20 before printing the encoded image 2, so that the encoded image has a surface which is as plane as possible. Advantageously, the thickness of that thickness creation volume 4 is substantially equal to the maximum thickness of the encoded image 2, minus the thickness of the ink which is actually deposited in the relevant location of the encoded image 2 to create said encoded image 2.
  One removes the ink that is not fixed on the surface of the printing substrate 10 before it solidifies, by any known washing or cleaning means. Advantageously, cleaning of an ink layer 1 is made with a cleaning tool which is rigid enough for not touching the spaces between the protrusions. This is particularly advantageous when the cleaned layer is black because the hollows between the elementary lenses are not optically efficient, or are only slightly efficient.
  The hardening of selected areas of an ink layer is obtained by emitting a concentrated beam of light causing or accelerating the polymerization of said selected areas to obtain more complex shapes than those obtained by the sole action of the surface tension of the ink.
  Ink is deposited in the form of flat tint layer on the entire surface comprising protrusions or protrusion preliminary shapes, and one lets the ink fall between the protrusions by gravity. A refinement of this method is to—temporarily or permanently—increase the surface tension of the surface located between said protrusions before the deposition of the additional layer. Advantageously, the ink deposited between the protrusions may have a low surface tension to subsequently repel other high surface tension ink flat tint layers towards the protrusions.
  One deposits by electrostatism a transparent sheet on the face of the lenticular array opposite to that containing the elementary lenses 11, 12, 13 and following, before printing the encoded image 2, and one prints the encoded image not on the back of the printing substrate 10 but on said transparent sheet. This allows an easy changing of visual while reusing the same lenticular array.

Several modes of implementation may be considered without departing from the scope of this invention.
  An intermediate film 10 is affixed onto the encoded image before printing the elementary lenses on the said intermediate film.
  An intermediate film comprising the printed elementary lenses is affixed onto the printing substrate of said encoded image after printing the encoded image
  A film comprising the encoded image is affixed onto the substrate comprising the elementary lenses.

The present invention also covers machines implementing the processes described above.

It is possible to carry out many devices according to the present invention, which are characterized by the fact that they comprise transparent cores forming convex protrusions, which are covered with one or more so-called additional layers made of a substance which also forms convex protrusions.

The devices according to the invention can consist of several layers of ink that are identical or different. An additional layer itself may have a refractive index which is identical to or different from the refractive index of the preceding one, of a colouring identical or different from the preceding one, translucent, conducting of electricity or insulating, reflective. It may shrink when cooled, be adhesive or be photochromic, that is to say its transparency and/or color may be modified by varying the temperature or by a special radiation.

The devices according to the invention comprise a printing substrate 10 which may also be of a special nature in terms of the optical element to achieve: transparent, translucent, having a refractive index which is different from that of the transparent ink used for the first layer, reflective, electrically conductive or electrically insulating.

In a particular embodiment, the printing substrate 10 is photochromic, which allows many applications such as the achievement of aesthetic covers for solar collectors, or umbrellas hindering passage of direct sunlight. In the first case, the medium becomes transparent to heat or light and in the second case, it becomes rather dark.

When the device according to the invention is a cover of solar heat, to improve aesthetics or to hide it, the photochromic medium is allowed to pass infrared rays. When it is a cover of a solar photovoltaic collector, it must let pass the rays which may be converted into electricity by the photovoltaic cell used.

The printing substrate 10 of the printed optical elements can be rendered photochromic because it is composed of particles that shrink or expand when said material moves from said low temperature to high temperature itself. It may in this case be advantageous that said particles are locked up in cells.

A device according to the invention can produce heat, and it is advantageous to arrange behind the elementary lenses a wall which is heat conductive and is preferably close to the focusing surface of said elementary lenses. It can also include two photochromic films, one being clear and the other darker. The clear film is located near the elementary lenses to restore light to the spectators and the darker film is located on the opposite side for not restoring light on the other side and converting light into heat.

The lenticular arrays are one of the great important applications of this invention. In this case, the printed optical elements are convergent lenses that can be contiguous, and the printing substrate is transparent.

For many applications, said converging lenses are advantageously similar and evenly spaced to form a regular lenticular array. The lenses can be cylindrical or spherical. In the latter case, they advantageously have a pupil in the form of a hexagon whose opposite sides are parallel between them, or still better in the form of regular hexagons. The device can be used to read an encoded image and to produce animations and stereoscopic images. In this case, the focusing surface of a convergent lens is advantageously merged with the opposite face of the transparent substrate 10 on which it is printed.

For other applications, it is on the contrary advantageous that the focusing surface of a convergent lens is close to the opposite face of the transparent substrate on which it is printed, without however being merged with the latter. It is in particular the case for the realization of projection screens and that of reflecting devices (e.g. road traffic signs).

For an application to architecture, a convergent lens is advantageously placed under a pane to be protected from the bad weather.

A device according to the invention is the combination of an encoded image consisting in elementary encoded images cooperating with an array of elementary lenses. One can use such a lenticular array to produce 3D animations but also images that are unintelligible to the viewer, and that can be interpreted only by a camera connected to a computer.

The application of this invention to lenticular arrays may be achieved according to several different arrangements:
  An elementary encoded image is printed on the same side of the printing substrate 10 as the elementary lens with which it cooperates;
  said printing substrate 10 or 20 as the case may be having received the printing of an elementary encoded image is covered with a transparent flat tint layer and with the elementary lens it is cooperating with;
  the printing substrate 10 or 20 as the case may be having received the printing of an elementary encoded image is covered with a transparent film on which the elementary lens with which it cooperates is printed, this lens being printed before or after the assembling of said transparent film and said encoded image;
  an elementary encoded image is printed on the back of the printing substrate 10 on the front of which the elementary lens with which it cooperates is printed.

A particular application is that the elementary protrusions 11, 12, 13 and the following are separated by transparent surfaces, and that elementary images 21, 22, 23 and the following are also separated by transparent surfaces. In this case, the viewer located on the side of the lenses sees 3D animation, and the one which is on the opposite side sees through the transparent surfaces, even more easily when the opposite side of the lenses of the device is dark. Such products are advantageously stickers to be affixed to windows of buildings. One can obtain a similar result with a printing substrate 10 pierced with holes.

To carry out lenticular arrays with high focal length, the space between the lenticular array 1 and the focusing surface 2 is advantageously a volume of air. These two components can be flexible to be reeled and the spacing can be kept constant in the operating position by foam blocks 5a and 5b as those shown on FIGS. 19a to 19c, or by any other known system. This volume can also be inflated to the condition that the enclosure is sealed. One application of this provision is that of swimming pool covers.

An application of this invention is a reflective coating: a transparent film 10 having converging lenses 11, 12 and following, preferably thinner than the focal length of said elementary lenses. The light reaching the device is substantially returned to its source, taking the color of the surface behind each convergent lens. The light rays are returned not only towards their source but also in the immediate vicinity. The transparent film 10 is preferably deformable in case one wants to apply the device on a car body, for example, to make it reflective.

By providing a white surface on the back of the transparent film, such a device is a projection screen. For this application, an elementary converging lens is advantageously aspheric—distorted in width so that parallel rays reaching it converge on a surface with a broader width than height, and not on a point—what makes it possible to diffuse the light returned by the screen towards a field of visibility which is broader than high, corresponding to the location of the spectators. The invention is also a projection system comprising a projector and a device like the one just described.

A close application is an overhead screen: the printing substrate 10 on which a protrusion is printed is transparent, the convex protrusions are converging lenses 11, 12 and following, and there is an area located on the back of the printing substrate 10, which is badly reflective with the exception of small transparent or translucent surfaces that are substantially aligned with on the one hand a P point called "projector's location" located at a distance of the device on the side of elementary lenses, and on the other hand optical centers of said converging lenses 11 12 and following. The present invention allows finally to implement the one made by Takeo Shimizu (U.S. Pat. No. 1,942,841—Daylight Screen—Jan. 9, 1934) who had described at that date a screen comprising a set of tiny convergent lenses on the front face, and a back face blackened with the exception of the points where the light of the projector converges, that are transparent. These small transparent or translucent surfaces can be created for example by burning the low-reflectance surface located on the back of the printing substrate with a source of infrared radiation placed where the projector will be placed later on. The burned material can then be removed by brushing or any other known method.

In a variant embodiment, the device includes another converging lens on the opposite side of the transparent substrate on which it is printed. The lenses are situated opposite, which is possible with the process described above. In this variant too, the back of the lenses can be created by polymerizing ink applied on the back with a UV source placed where one will later put the projector.

In both variant embodiments, the invention is also an overhead projection system comprising a projector and a lenticular array device according to the invention.

Instead of two lenses which are located respectively at both sides of the transparent printing substrate 10 being located perfectly opposite, a difference of parallax can be organized so that the centers of these optical lenses located on the back are aligned on the one hand with the optical center of the projector lens and on the other hand with the centers of optical lenses located at the front side.

An improvement of the lenticular arrays which is made possible by the present invention consists in using elementary encoded images whose surface is curved, substantially corresponding to the focusing range of the considered elementary lens. The advantage is a greater clarity for viewers who are not located in front of the device, and therefore an increase in the number of possible images represented. As shown in FIG. 13, the elementary encoded images 21b, 22b and 23b and following can be partially superimposed to elementary encoded images 21a, 22a and 23a. This arrangement of elementary images permits to view images from locations that would not allow it with flat elementary encoded images.

One can benefit from this to add to the device a device of vision with determination of the parallax as that illustrated by FIG. 14, for example a simple ball mirror 60. The spectator sees on this ball the image made up of the pixels of the elementary images located in the alignment of the optical centers of the elementary lenses of the aforesaid lenticular array, here the mention "OK". The ball can be replaced by a camera. This device opens to lenticular arrays according to the invention applications in the field of security printing. These applications were impossible in the prior art because one could not register with sufficient precision an elementary encoded image and an elementary lens. In an advanced mode, images which are visible to the viewer are not intelligible and can be interpreted only by a camera connected to a computer.

To manufacture an elementary encoded image whose surface is curved, one can print several thicknesses of ink successively as it is illustrated on FIGS. 11 and 12. The unit is advantageously subsequently covered with a final ink layer determining a smoothed curved form, on which the encoded image is then printed.

The present invention also makes it possible to carry out optical fibers by any scanning printing technique. In this case, the surface of the printing substrate 10 on which is printed a protrusion is "reflective", and one of the so-called additional layers is also "reflective". One understands by "reflective" the property of a material to reflect the rays arriving from a volume of a first material on the aforementioned "reflective" material with a strong incidence (a high angle formed with a perpendicular to the surface of the material), which is the case if the aforementioned material is a mirror, and also if its refractive index is appreciably lower than that of the aforesaid first material.

These fibers may contain dots not covered with the said reflective material, letting escape the light to create decorative light chains, or have areas where the printing substrate 10 or the additional reflective layer is transparent, to get the same effect.

An optical fiber can be coated with a layer obstructing the passage of light, for example being reflective or having a refractive index lower than the ink used to create the cores of the optical fibers. It can then be covered with another optical fiber, and this opens the way for the realization of multilayer optoelectronic circuits.

The direction of light rays through optical fibers must remain as close as possible to the longitudinal axis of the fiber, and many known phenomena on the contrary tend to modify this orientation to draw aside the luminous rays from this axis. The present invention provides a device illustrated in FIG. 7 to remedy this. This device includes an elongated transparent volume 40 so-called "rectifier" covered with a reflective coating, comprising a longitudinal axis and having a light receiving end called upstream end which is closer than the other end called downstream end, and at least one elongated transparent volume called "concentrator" 51 coated with a reflective coating, comprising a longitudinal axis, and having a light receiving end called upstream end which is wider than the other end called downstream end.

It is advantageous that the elongation of the said concentrator be greater than the elongation of said rectifier, being said that here-above the term elongation means the ratio L/D between on the one hand the length "L" of the upstream to the downstream ends of the considered component, and on the other hand the absolute value of the difference in width "D" of its upstream and downstream ends. In a preferred embodiment, a rectifier is advantageously associated with more than one concentrator. This applies especially when it includes a longitudinal slot 70 which separates two concentrators 51 and 52, as shown in FIG. 7. In an alternative, a rectifier has edges in the form of parabola of focus P, and a rectilinear upstream end passing by the aforementioned focus P, which causes to make all the light rays parallel with the longitudinal axis of the device (represented by element 40 of FIG. 7). Rectifiers/concentrators can be combined in series as shown in FIG. 8, to improve their effectiveness.

One can also provide such a device with one sensor of light which receives the light by its upstream surface—perpendicular to the surface of the printing substrate 10 as represented on the FIG. 8—which is transparent. Such devices can be associated in parallel to create a sensor of ambient light, for example the sensor of light 1001 represented on FIG. 16.

Another sensor of light according to the invention is represented on FIG. 20. It is composed of a lenticular array with elementary spherical lenses 11, 12 and following, cooperating with a plate 500 comprising optical fiber inputs 511, 512 and following. Rods 401, 402 and following make it possible to align the aforesaid optical fiber inputs and an optical center of one of the aforesaid elementary lenses with the source of light. Relative displacement of the aforesaid lenticular array and of the aforesaid plate 500 of the device can be motorized and controlled by a computer. The plane of the lenticular array is preferably parallel to that of plate 500, and preferably directed to be in an orthogonal plane with the average radii resulting from the source of light.

Two optical fibers can be printed in Y to constitute a distributor or a mixer of light rays: a fiber comprising a widened section being divided into two, or two fibers amalgamating in only one.

A major application of this invention is the realization of layers of optical fibers which are parallel to each other, which may be contiguous as shown in FIG. 9. Such layers can be connected by a device shown in FIG. 10, which includes pipes whose inner surfaces are reflective, each end of a pipe cooperating with an optical fiber of a layer of printed optical fibers. Such a connector may include a mechanical means for interrupting the transmission of light, such as the pusher 100 shown in FIG. 10.

The downstream end of a printed optical fiber diffuses the light it transmits, and it is enough to cover this end with a reflecting material which is suitably orientated to reflect the light towards the spectator, for example towards the printing substrate 10 (transparent at this place) on which it is printed. Advantageously, the form of this end approaches that of a convex lens appreciably broader than the aforementioned optical fiber, to constitute the pixel 11 of an image, as represented on FIG. 15. The optical fiber bringing the light can also circumvent a printed protrusion so that the section of its end is located in a plane essentially different from a plane perpendicular to the plane of the printing substrate 10 (not represented).

According to the present invention, one can thus achieve screens producing organized or non-organized light. It is enough for that that a convex protrusion known as pixel comprises an end of a printed optical fiber whose other end is connected to a source of light. The aforementioned pixel is advantageously covered with a layer of reflective ink, on the side opposed to the spectator. On the side of the spectator, the aforementioned pixel can be colored in red, green or blue. Three adjacent pixels then constitute an RGB triplet (Red Blue Green), and the screen can diffuse still or animated color images. One can also print an image on the whole set of the aforesaid pixels to create a luminous image. Even by not printing anything, one carries out with less expenses a very thin retro-lighting device.

By providing such a screen with a known means 8 of electronic limitation of the light device like a liquid crystal, one can create an ultra-thin video screen, which can for example be rolled up on itself for storage. The refresh rate of the aforesaid means of electronic limitation device of the light can be higher than the refresh rate of the unit of the aforesaid pixels, and the device advantageously comprises in this case a swiveling mirror making it possible to reflect the light transmitted through the aforementioned electronic limitation of the light device, sequentially to different subsets of those fiber optic ends.

One can connect subsets of pixels to different sources of light. The principle of the U.S. Pat. No. 5,293,437—filed on Jun. 12, 1992—which mentions that a subset of the aforesaid pixels receives the light of a red source of light, that a subset of the aforesaid pixels receives the light of a blue source of light, and that a subset of the aforesaid pixels receives the light of a green source of light can finally be implemented easily.

One knows the application FR/09-01324 which consists in diffusing two right eye and left eye images forming a stereoscopic couple by a series of colors corresponding to different wavelengths, in additive or subtractive synthesis, which allows a spectator provided with glasses whose each filter blocks at least partially the vision of the ranges of wavelengths used to emit the image intended for the other eye makes it possible to see the 3D effect. The two images are displayed on different portions of the display device. The present invention lends itself particularly well to the implementation of the object of application FR/09-01324: two subsets of the aforesaid pixels emit light in two appreciably different wavelengths of red color, two subsets of the aforesaid pixels emit light in two appreciably different wavelengths of green color, and two subsets of the aforesaid pixels emit light in two appreciably different wavelengths of blue color. A so-called right eye image is emitted by the additive synthesis of the one of the two wavelengths of color red, of the one of the two wavelengths of green color, and of the one of the two wavelengths of blue color, and the other so-called left eye image is emitted by the additive synthesis of the other of the two wavelengths of red color, of the other of the two wavelengths of green color, and of the other of the two wavelengths of blue color.

One knows various types of devices permitting to collect the sunlight or the ambient light, like in particular those described in FIGS. 8 and 20. The present invention makes it possible to connect such devices at the end of a printed optical fiber, the other end of the aforesaid fiber being connected to a pixel of a screen. One can thus diffuse the light in a part which does not have an opening towards the outside light, by connecting a pixel 11 or a screen made up of such pixels by an optical fiber or a layer of fibers to such a light collector located outside.

It has been seen that the present invention makes it possible to carry out thin and cheap means of retro-lighting. A particularly advantageous implementation consists in that the aforementioned means of collecting the light is in this case located on the edge of the retro-lighting device, i.e. on the periphery of the surface comprising the aforementioned pixels.

The present invention makes it possible to produce keyboards of all kinds, for example by using a transparent protrusion made up of a compressible transparent volume surrounded by a reflective material, or a switch of light like that represented in FIG. 10. In a simplified model, the moving part 100 can be replaced by a finger of the user.

It also makes it possible to produce solar collectors. One then provides the device with a heat exchanger to constitute a heating device. The device can be floating to constitute a cover of a swimming pool to reheat water. One can also provide it with semiconductors to constitute a photovoltaic sensor. Enclosures such as greenhouses can also be a device according to the present invention, as soon as they are provided with a solar collector according to one of the previously described embodiments.

There are many methods to assemble an encoded image 2 with a lenticular array 1 according to the present invention.

The encoded image can be printed on a removable electrostatic film applied to the face of the printing substrate 10 which is opposed to the elementary lenses. That makes it possible to change the encoded image easily, while benefiting of the fixed geometry of the lenticular array during the printing process (whereas a thin electrostatic film does not hold).

An electrostatic sheet can imprison the aforementioned encoded image between the aforementioned lenticular array and the aforementioned electrostatic sheet, under the condition that the aforementioned electrostatic sheet overflows of the aforesaid encoded image to adhere by electrostatics directly to the lenticular array.

A self-adhesive sheet can imprison the aforementioned encoded image between the aforementioned lenticular array and the aforementioned self-adhesive sheet, the aforementioned self-adhesive sheet overflowing of the aforesaid encoded image to adhere directly to the lenticular array, and an elastic volume as a flexible foam with open cells is compressed during the assembly of the device, so that when it seeks to take again its initial volume, it absorbs the residual air located between the encoded image and the back face of the lenticular array.

The elementary lenses can be printed on a printing substrate 10, separated from the printing substrate 20 of the coded image 2 as represented on FIGS. 19 and 19c, two supports 10 and 20 being maintained spaced apart by any known mechanical means.

The applications of this invention are in the fields of printing works, and in particular of the printing works of art or imagination, in the field of lenticular arrays, optical circuits, optical fibers, video screens, luminaries, optical sensors, optoelectronics, etc.

The invention claimed is:

1. A method for manufacturing printed optical elements, comprising:
   printing with a scanning printing technique a first layer of a transparent ink on elementary surfaces of a printing substrate in order to create reference marks constituting cores,
   solidifying said cores, and
   subsequently printing with said scanning printing technique, at least one additional layer of a liquid ink, each of the said additional layers being solidified to form convex protrusions constituting said printed optical elements, wherein
   said transparent ink used for printing said reference marks has a significantly higher surface tension than that of said printing substrate,
   said liquid ink used for printing said additional layers has a significantly higher surface tension than that of surfaces of said printing substrate that have not been printed with the reference marks,
   each ink is a substance that is adapted to be made solid, and
   said scanning printing technique is a printing technique that includes depositing ink on a printing substrate in either (1) one operation, or (2) by successive stripes from one side of the printing substrate to the opposite one, in contrast to a plotting printing technique that consists in depositing the substance by following each curve to be drawn on the printing substrate.

2. The method of claim 1, wherein each said additional layer is printed on said cores created on the printing substrate so that, after solidification, each part of each additional layer deposited on a corresponding core has a greater surface on the printing substrate than the surface of said corresponding core.

3. The method of claim 1, wherein said additional layer is applied in the form of one or more flat tint layers.

4. The method of claim 1, wherein an intermediate film is affixed on a coded image formed on a supporting structure before printing of said printed optical elements on said intermediate film which constitutes said printing substrate, said printed optical elements constituting elementary lenses.

5. The method of claim 1, wherein an intermediate film is affixed on a coded image formed on a supporting structure after printing of said printed optical elements on said intermediate film which constitutes said printing substrate, said printed optical elements constituting elementary lenses.

6. The method of claim 1, wherein said first layer used for creation of said reference marks is deposited in liquid form.

7. The method of claim 1, wherein said first layer used for creation of said reference marks is deposited in non liquid form.

8. A device obtained by the method according to claim 1, comprising several of the printed optical elements printed on a the printing substrate, each of the printed optical element comprising the transparent convex protrusion constituted by the reference mark constituting the core covered by at least the additional layer of ink.

9. The device of claim 8, wherein said additional layer defines convex protrusions which are wider than the corresponding cores on which they are deposited.

10. The device of claim 8, wherein each printed optical element has a surface which is constituted by an aqueous ink.

11. The device of claim 8, wherein each of said convex protrusions constitutes an aspheric converging lens which is distorted in width so that parallel rays reaching it converge on a surface broader than high and not on a point.

12. The device of claim 8, wherein at least one used ink is photochromic, whereby its transparency or its color can be modified by a variation of the temperature or by a particular radiation.

13. The device of claim 8, wherein each of said convex protrusions is an elementary converging lens and wherein elementary coded images respectively cooperate with corresponding said elementary converging lenses and wherein the whole of the images visible by a spectator is not understandable and can be interpreted only by a camera connected to a computer.

14. The device of claim 8, wherein said protrusions constitute first converging lenses formed on a first face of said printing substrate, and wherein the device includes second convergent lenses formed opposite said first converging lenses on a second face of the transparent substrate on which they are printed.

15. A method for manufacturing printed optical elements, comprising:
   printing with a scanning printing technique a first layer of a transparent ink on elementary surfaces of a printing substrate in order to create reference marks constituting cores,
   solidifying said cores, and
   subsequently printing with said scanning printing technique, at least one additional layer of a liquid ink, each of the said additional layers being solidified to form convex protrusions constituting said printed optical elements, wherein
   said transparent ink used for printing said reference marks has a significantly higher surface tension than that of said printing substrate,
   said liquid ink used for printing said additional layers has a significantly higher surface tension than that of surfaces of said printing substrate that have not been printed with the reference marks,
   each ink is a substance that is adapted to be made solid, and
   said scanning printing technique is a printing technique that includes
   depositing ink on a printing substrate in either (1) one operation, or (2) by successive stripes from one side of the printing substrate to the opposite one, in contrast to a plotting printing technique that consists in depositing the substance by following each curve to be drawn on the printing substrate, said device comprising several printed optical elements printed on a printing substrate, each printed optical element comprising a transparent convex protrusion constituted by a reference mark constituting a core covered by at least an additional layer of ink, wherein said convex protrusions constitute elementary converging lenses, and elementary coded images respectively cooperate with said elementary converging lenses, with each of said elementary coded images having a curved surface substantially corresponding to a field of focusing of the corresponding elementary converging lens.

* * * * *

UNITED STATES PATENT AND TRADEMARK OFFICE
CERTIFICATE OF CORRECTION

PATENT NO. : 8,472,118 B2
APPLICATION NO. : 12/992720
DATED : June 25, 2013
INVENTOR(S) : Guigan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this
Eighth Day of September, 2015

Michelle K. Lee
*Director of the United States Patent and Trademark Office*